(12) United States Patent
Furukawa

(10) Patent No.: US 7,538,497 B2
(45) Date of Patent: May 26, 2009

(54) CONSTANT CURRENT DRIVER, BACK LIGHT SOURCE AND COLOR LIQUID CRYSTAL DISPLAY

(75) Inventor: Norimasa Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 10/560,444

(22) PCT Filed: Mar. 24, 2005

(86) PCT No.: PCT/JP2005/005370

§ 371 (c)(1),
(2), (4) Date: Dec. 13, 2005

(87) PCT Pub. No.: WO2005/104246

PCT Pub. Date: Nov. 3, 2005

(65) Prior Publication Data
US 2006/0176411 A1      Aug. 10, 2006

(30) Foreign Application Priority Data
Apr. 20, 2004    (JP)    .............................. 2004-124795

(51) Int. Cl.
*G05F 1/00* (2006.01)
(52) U.S. Cl. ........................ 315/291; 315/312; 315/315; 315/169.1; 345/102; 345/204; 345/40; 349/65; 362/227
(58) Field of Classification Search ................. 315/291, 315/307, 310, 312, 315, 169.1, 169.3; 345/39, 345/40, 44, 46, 82, 83, 102, 104, 204, 690; 349/1, 33, 65, 69, 149; 362/227, 251, 800
See application file for complete search history.

(56) References Cited

U.S. PATENT DOCUMENTS 4,915,478 A  *  4/1990   Lenko et al. ................... 349/65

(Continued)

FOREIGN PATENT DOCUMENTS

DE            1984140          3/2000

(Continued)

OTHER PUBLICATIONS

Japanese Office Action issued on Oct. 30, 2007.

(Continued)

*Primary Examiner*—Haissa Philogene
(74) *Attorney, Agent, or Firm*—Sonnenschein Nath & Rosenthal LLP

(57) ABSTRACT

Disclosed is a constant current driving unit for constant current driving a plural number of series connected light emitting diodes by a pulse-width modulating constant current driving circuit. Bypass circuits (80A) to 80(E), made up by a plural number of thyristors (81A) to (81E), each connected in parallel with each of series-connected light emitting diodes (41A) to (41E), are provided with gate potential setting circuits (83A) to (83E). These gate potential setting circuits afford to the thyristors a gate potential value such that, when the series-connected light emitting diodes (41A) to (41E) are operating as normally, the thyristors (81A) to (81E) are in the off-state. The gate potential setting circuit affords to the thyristors another gate potential value such that, when the light emitting diodes (41A) to (41E) are in the open state, the thyristors connected in parallel with the light emitting diodes (41A) to (41E) in the opened state will be in a turned-on state.

6 Claims, 13 Drawing Sheets

U.S. PATENT DOCUMENTS

| | | | |
|---|---|---|---|
| 6,211,652 B1 | 4/2001 | Glasgow | |
| 6,396,466 B1 * | 5/2002 | Pross et al. | 345/82 |
| 6,515,434 B1 * | 2/2003 | Biebl | 315/291 |
| 6,771,327 B2 * | 8/2004 | Sekiguchi | 349/12 |
| 6,858,994 B2 * | 2/2005 | Vollrath | 315/200 A |
| 6,870,328 B2 * | 3/2005 | Tanabe et al. | 315/291 |
| 6,897,922 B2 * | 5/2005 | Ikeno et al. | 349/113 |
| 7,042,165 B2 * | 5/2006 | Madhani et al. | 315/185 R |
| 7,106,395 B2 * | 9/2006 | Maeda | 349/65 |
| 7,170,234 B2 * | 1/2007 | Chikugawa et al. | 315/209 R |
| 7,185,995 B2 * | 3/2007 | Hatanaka et al. | 362/29 |
| 2002/0043943 A1 | 4/2002 | Menzer et al. | |
| 2002/0060526 A1 | 5/2002 | Timmermans et al. | |
| 2005/0231459 A1 * | 10/2005 | Furukawa | 345/102 |
| 2006/0022616 A1 * | 2/2006 | Furukawa et al. | 315/309 |

FOREIGN PATENT DOCUMENTS

| | | |
|---|---|---|
| EP | 1322139 | 6/2003 |
| GB | 1204651 | 9/1970 |
| JP | 05316719 | 11/1993 |
| JP | 6-72256 | 7/1994 |
| JP | 06-318732 | 11/1994 |
| JP | 2001-28461 | 1/2001 |
| JP | 2003-152224 | 5/2003 |
| JP | 03/075423 | 9/2003 |
| WO | 2003075423 | 9/2003 |

OTHER PUBLICATIONS

European Search Report filed on Feb. 20, 2008 in connection with European Patent Application No. 05721384.5.

* cited by examiner

CONSTANT CURRENT DRIVER, BACK LIGHT SOURCE AND COLOR LIQUID CRYSTAL DISPLAY

TECHNICAL FIELD

This invention relates to a constant current driving unit for constant current driving a plural number of series-connected light emitting diodes (LEDs) using a pulse width modulating constant current driving circuit. This invention also relates to a backlight light source unit and a color liquid crystal display apparatus, driven by this constant current driving unit.

This application claims subject-matter related to Japanese Patent Application JP 2004-124795, filed in the Japanese Patent Office on Apr. 20, 2004, the entire contents of which are incorporated herein by reference.

BACKGROUND ART

Recently, the tendency is towards using a display of thin thickness, as exemplified by a liquid crystal TV or plasma display (PDP: Plasma Display Panel). In particular, most of the displays for mobile use are liquid crystal displays for which faithful color reproducibility is desirable. On the other hand, the mainstream of the backlight for the liquid crystal panel is the CCFL (Cold Cathode Fluorescent Lamp) type, employing fluorescent tubes. For maintaining environmental safety, there is now raised a demand for a light source that may be manufactured without employing mercury, and the use of e.g. light emitting diodes is thought to be promising as a light source which should take the place of the CCFL.

In general, in a display employing light emitting diodes, as display pixels, there is needed an X-Y addressing driving circuit for each pixel for matrix driving the light emitting diodes. By this X-Y addressing driving circuit, the light emitting diodes, lying at the positions of the pixels, light emission from which is desired, are selected (addressed), and the time duration for light emission is modulating by pulse width modulation driving ((PWM: Pulse Width modulation) driving)), for effecting luminance adjustment, in order to produce a display picture with preset gray scale characteristics. The result is the complicated and expensive circuitry for driving. This sort of the display may be exemplified by one disclosed in the Japanese Patent Application Laid-pen No. 2001-272938.

DISCLOSURE OF THE INVENTION

Problems to be Solved by the Invention

Meanwhile, a light emitting diode has its useful life and may cease to emit light. The manner of destruction of individual devices may roughly be classified into malfunction caused by line disconnection (OPEN mode destruction), malfunction caused by short-circuiting (Shorting destruction) and malfunction which is not the open mode destruction nor shorting destruction and which leads to lowered light volume. For detecting these malfunctions, it is necessary to use a method of driving individual LED devices by independent driving circuits and to construct a system of perpetually feeding back the operating state of the individual devices. The result is that not only the cost is increased but also difficulties are encountered in implementation of such system on an actual apparatus.

Such a picture display system also is in use in which light emitting diodes are used as individual light emitting pixels However, in the matrix type driving for this case, there lacks up to now a system having a function such that, in driving a matrix, malfunctions of the individual light emitting diodes may distinctly be verified and removed, as explained previously.

If, in case of using light emitting diodes as backlight for a liquid crystal display, non-lighted sites are produced due to malfunctions of the light emitting diodes, irregular lighting is produced, such that the appearance of the overall display is deteriorated because of the larger power consumption and a relatively small number of the light emitting diodes. It may be conjectured that, in the LED driving device for illumination use, no matrix driving LSI for large power driving has been prepared, and demerits in cost persist, so that serial connection is currently used. However, the serial connection type is susceptible to failure of the individual light emitting diodes. Such failure of the individual light emitting diodes is conductive to turning off of the entire string of the light emitting diodes, to which belong the failed light emitting diodes, thus producing severe color irregularities.

It is therefore an object of the present invention to overcome the deficiency of the above-described prior-art system and to provide a constant current driving unit in which, if, in constant current driving of plural series-connected devices, such as light emitting diodes, one or more light emitting diodes suffer from the OPEN mode malfunctions, the device current which might pass through the malfunctioning site is caused to detour the site of disconnection, by way of automatically avoiding such site of disconnection. The present invention is also aimed to provide a backlight light source unit driven by this constant current driving unit, and a color liquid crystal display apparatus.

In one aspect, the present invention provides a constant current driving unit for constant current driving a plurality of series-connected devices by a pulse width modulating constant current driving circuit, in which the constant current driving unit comprises a bypass circuit including a plurality of thyristors each connected in parallel with each of the series-connected devices. The bypass circuit includes a gate potential setting circuit for affording to the thyristors a gate potential value such that, when the series-connected devices are operating as normally, the thyristors are in the off-state. When the devices are in the open state, the gate potential setting circuit affords to the thyristors another gate potential value such that the thyristors will be in a turned-on state.

In another aspect, the present invention provides a backlight light source unit for illuminating a display panel from a back side thereof, in which the backlight light source unit comprises a plurality of light-emitting diodes connected in series with one another, and a bypass circuit including a plurality of thyristors each connected in parallel with each of the series-connected light emitting diodes. The bypass circuit includes a gate potential setting circuit for affording to the thyristors a gate potential value such that, when the series-connected light emitting diodes are operating as normally, the thyristors are in the off-state. When the light emitting diodes are in the open state, the gate potential setting circuit affords to the thyristors another gate potential value such that the thyristors will be in a turned-on state.

In yet another aspect, the present invention provides a color liquid crystal display apparatus comprising a light transmitting color liquid crystal display panel including a color filter and a backlight light source unit for illuminating the light transmitting color liquid crystal display panel from its back side thereof. The backlight light source unit includes a plurality of light-emitting diodes connected in series with one another, and a bypass circuits each being a thyristor and each being connected in parallel with each of the series-connected light emitting diodes. The bypass circuit includes a gate potential setting circuit for affording to the thyristors a gate potential value such that, when the series-connected light emitting diodes are operating as normally, the thyristors are in the off-state. When the light emitting diodes are in the open state, the gate potential setting circuit affords to the thyristors another gate potential value such that the thyristors will be in a turned-on state.

In the constant current driving unit, backlight light source unit and the color liquid crystal display apparatus, according to the present invention, the gate potential setting circuit, provided to bypass circuits, composed of thyristors connected in parallel with plural series connected devices, applies such gate potential which will turn off the thyristors during the normal operation of the series-connected devices, and which, when one or more of the series connected devices are in open state, will turn on the thyristors connected to the devices which are now in the opened state. Thus, when the string of plural series-connected devices, such as light emitting diodes, is driven with the constant current, and one or more of the devices suffer from OPEN-mode malfunctions, the device current which would pass through the malfunctioning site may be detoured to automatically avoid the disconnected status of the malfunctioning site.

Other objects and advantages of the present invention will become more apparent from the following explanation of a preferred embodiment thereof especially when read with reference to the drawings.

BEST MODE FOR CARRYING OUT THE INVENTION

Figure 1:
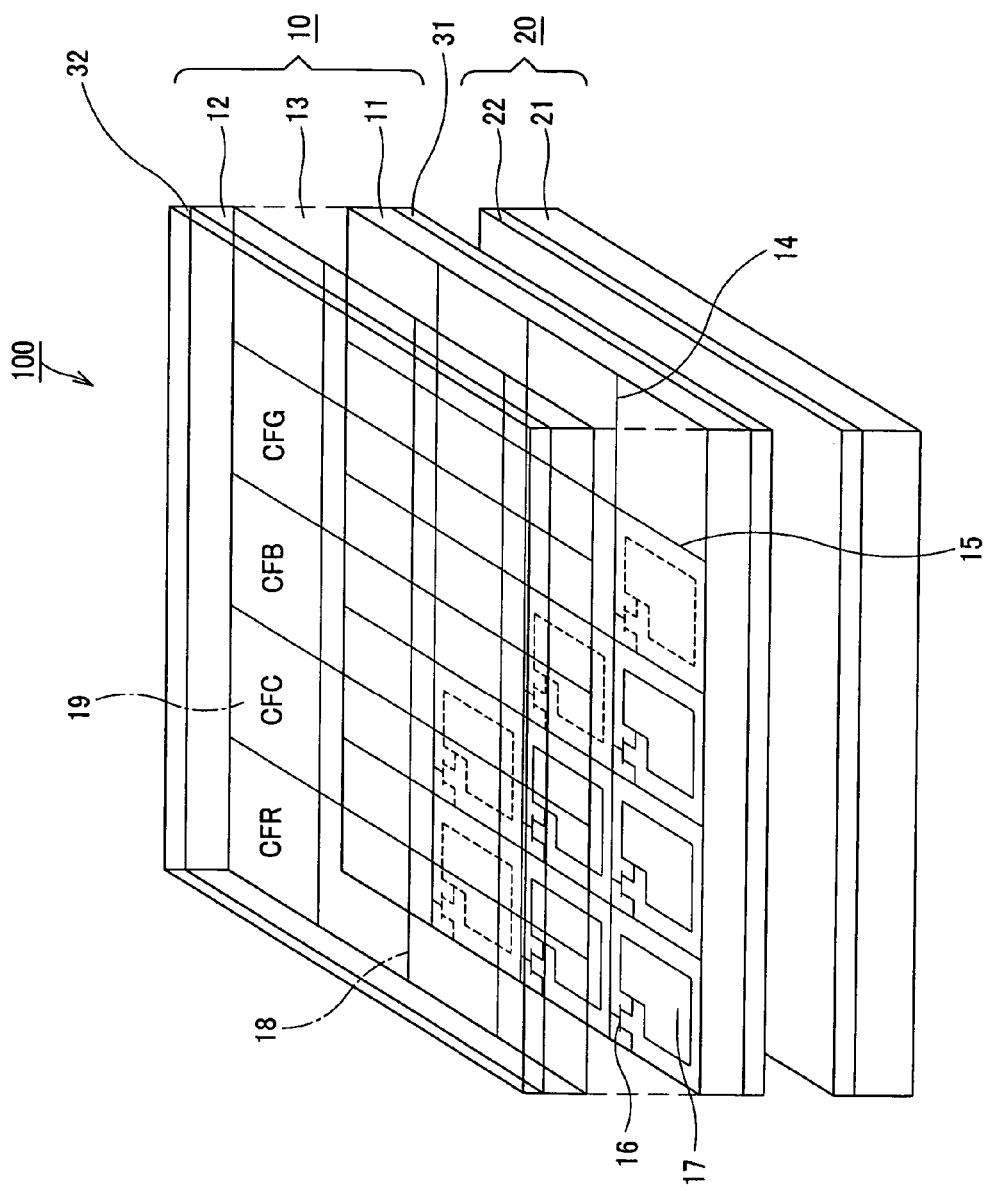
FIG. 1 is a perspective view showing a color liquid crystal display apparatus of the backlight system according to an embodiment of the present invention.

Referring to the drawings, a present embodiment of the present invention will be explained in detail. It is noted that the present invention is not limited to the embodiment now explained and may optionally be changed without departing from the scope of the invention.

The present invention is applied to a color liquid crystal display apparatus 100 of the backlight system, configured as shown in FIG. 1.

This color liquid crystal display apparatus 100 is made up by a light transmitting type color liquid crystal display panel 10 and a backlight light source unit 20 provided on the back side of the color liquid crystal display panel 10.

The light transmitting type color liquid crystal display panel 10 is made up by a TFT substrate 11 and a counter-electrode substrate 12 facing each other with a gap in-between. Within this gap, there is provided a liquid crystal layer 13 composed e.g. of twisted nematic (TN) liquid crystal. The TFT substrate and the counter-electrode substrate are transparent substrates formed of a transparent material, such as glass. The TFT substrate 11 includes plural signal lines 14 and plural scanning lines 15, arranged in a matrix configuration, and plural sets each composed of a thin-film transistor 16, operating as a switching device, and a pixel electrode 17. The thin-film transistors 16 are sequentially selected by the scanning lines 15 to write picture signals, supplied from the signal lines 14, in the pixel electrodes 17 associated with the thin-film transistors. On the surface of the counter-electrode substrate 12 facing the TFT substrate 11, there are formed counter-electrodes 18 and color filters 19.

With the present color liquid crystal display apparatus 100, a desired full-color picture is obtained by sandwiching the above-described light transmitting type color liquid crystal display panel 10 with two light polarizing plates 31, 32, and by driving the panel in accordance with an active matrix system, as the panel is illuminated from its back side with white light emanated from the backlight light source unit 20.

This backlight light source unit 20 is made up by a light source 21 and a wavelength selecting filter 22. The light radiated from the light source 21 illuminates the color liquid crystal display panel 10 from its back side via wavelength selecting filter 22.

Figure 2:
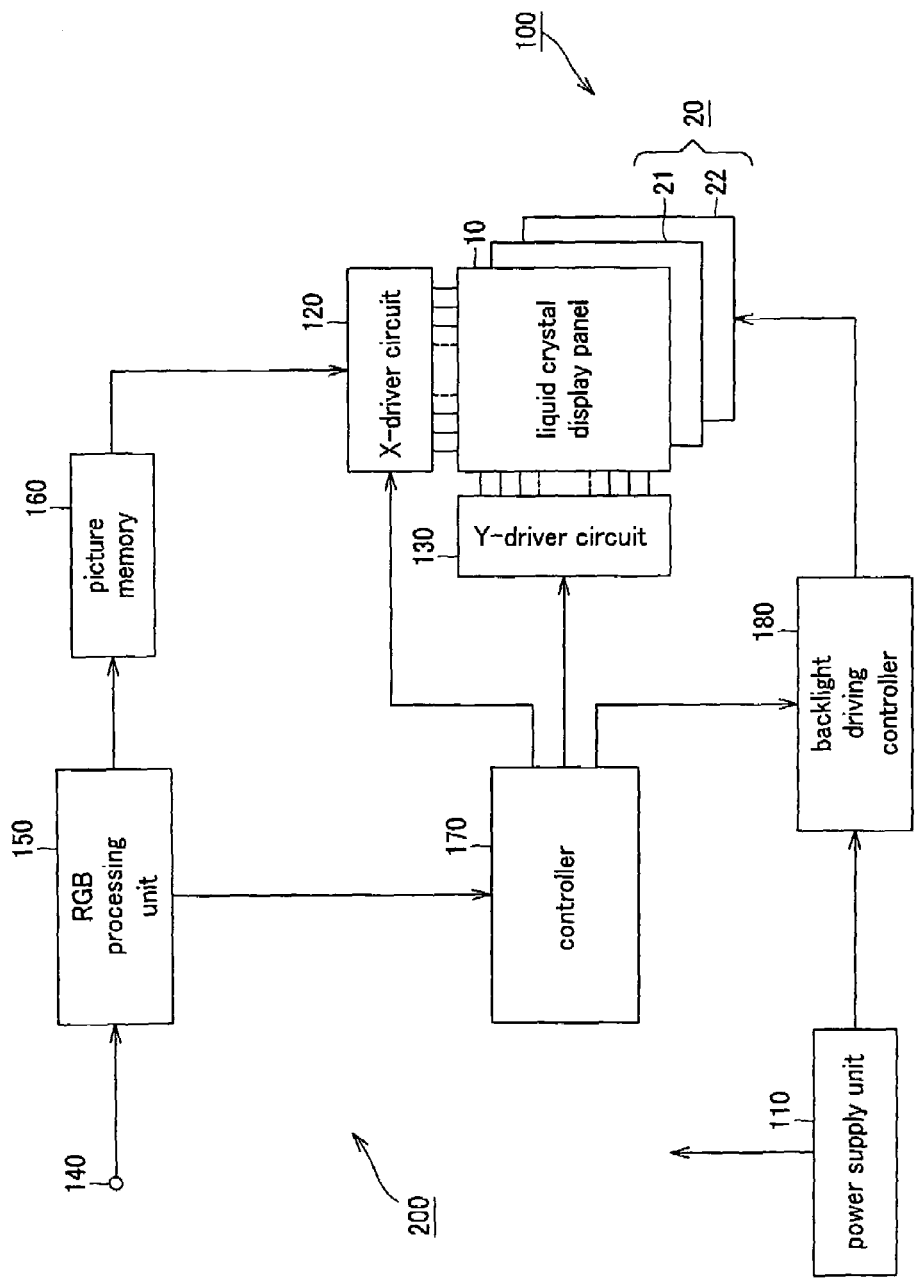
FIG. 2 is a block diagram showing a driving circuit forming the color liquid crystal display apparatus.

This color liquid crystal display apparatus 100 is driven by a driving circuit 200, configured as shown in FIG. 2.

The driving circuit 200 includes a power supply unit 110, for supplying the driving power for driving the color liquid crystal display panel 10 and the backlight light source unit 20, an X-driver circuit 120 and a Y-driver circuit 130, for driving the color liquid crystal display panel 10, an RGB processing unit 150, supplied from outside with picture signals via input terminal 140, a picture memory 160 and a controller 170, both connected to the RGB processing unit 150, and a backlight driving controller 180 for driving/controlling the backlight light source unit 20.

In this driving circuit 200, the picture signals, supplied via input terminal 140, are processed with chroma-processing by the RGB processing unit 150, and are converted from composite signals into separate R, G and B signals, suited for driving the color liquid crystal display panel 10. The so produced R, G and B signals are supplied to the controller 170, while being supplied via picture memory 160 to the X-driver circuit 120. The controller 170 also controls the X-driver circuit 120 and the Y-driver circuit 130 at a preset timing, related to the separated R, G and B signals, to drive the color liquid crystal display panel 10, by the distinct R, G and B signals, supplied to the X-driver 120 via picture memory 160, such as to display a picture corresponding to the separated R, G and B signals.

Figure 3A:
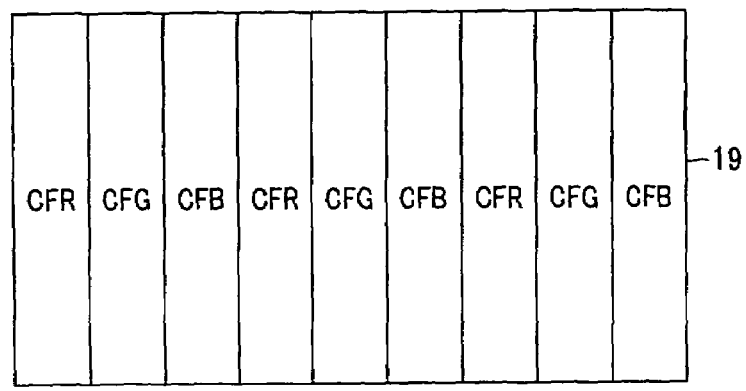
FIGS. 3A to 3C are plan views showing the configuration of a color filter provided to a color liquid crystal panel in the color liquid crystal display apparatus.
Figure 3B:
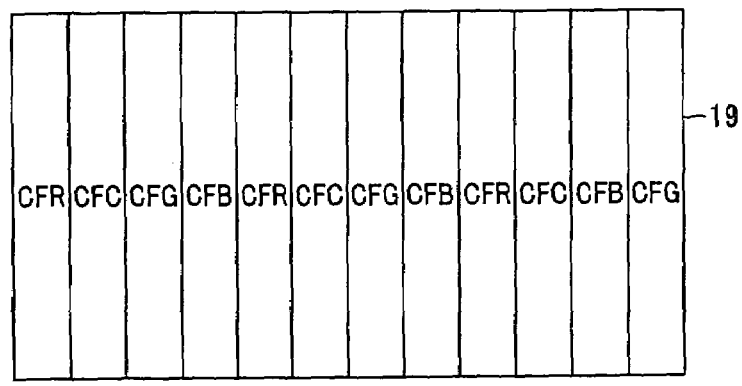
Figure 3C:
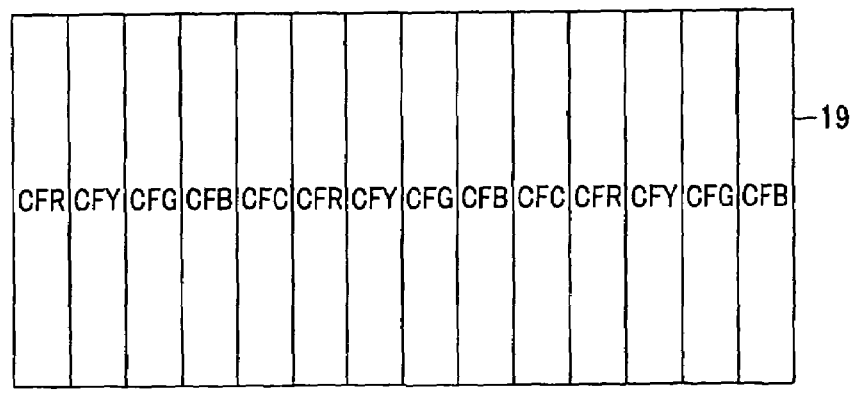

Meanwhile, each color filter 19 is divided into plural segments, as matched to the pixel electrodes 17. For example, each color filter may be divided into three segments of a red filter CFR, a green filter CFG and a blue filter CFB, representing three prime colors, as shown in FIG. 3A, or into four segments of a red filter CFR, a cyan filter CFC, green filter CFG and a blue filter CFB, representing three prime colors (RGB) and cyan (C), as shown in FIG. 3B. Each color filter may also be divided into five segments of a red filter CFR, a cyan filter (CFC), a green filter CFG, a yellow filter CFY and a blue filter CFB, representing three prime colors (RGB) with cyan (C) and yellow (Y), as shown in FIG. 3C.

The backlight light source unit 20 uses a light source 21 of an area lighting system for illuminating the light transmitting type color liquid crystal display panel 10 by plural light emitting diodes (LEDs) arranged on the back side of the display panel.

The manner of arraying the light emitting diodes, forming the light source 21 of the backlight light source unit 20, will now be explained.

Figure 4:
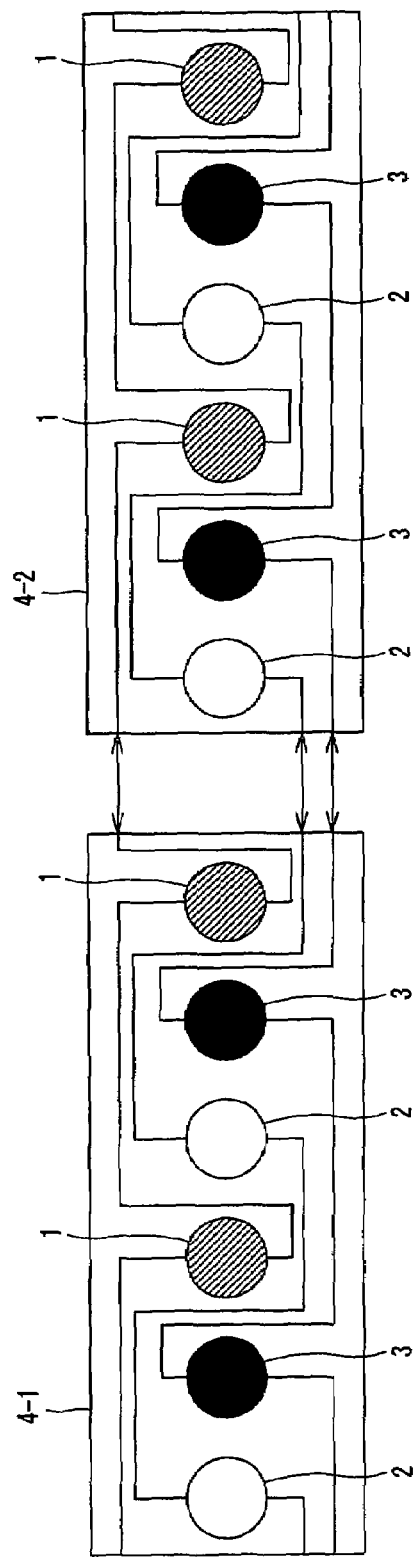
FIG. 4 schematically shows an illustrative configuration of light emitting diodes in the backlight light source unit forming the color liquid crystal display apparatus.

FIG. 4 shows, as an instance of arraying the light emitting diodes, the arraying in a row of two each of red light emitting diodes 1, green light emitting diodes 2 and blue light emitting diodes 3, for each of unit cells 4-1 and 4-2, with the total number of the diodes thus being six.

Although the number of the light emitting diodes used in the present case is six, the number of light emitting diodes of the respective colors may be varied from that of the instant embodiment in view of the necessity of adjusting the light output balance for achieving well-balanced white light, as a mixed color, depending on the rating or the light emitting efficiency of the light emitting diodes used.

Figure 5:
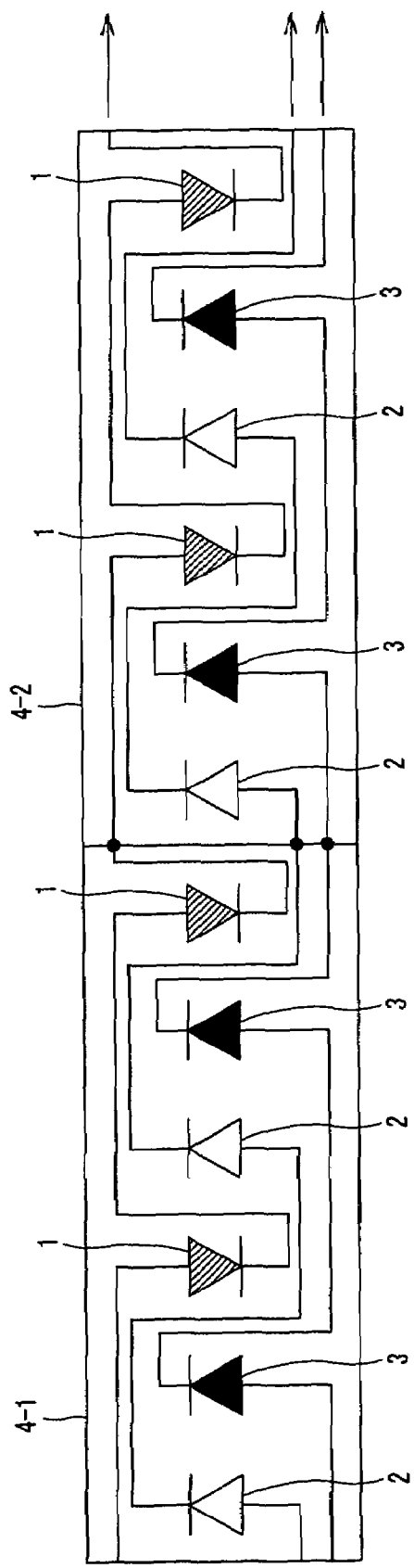
FIG. 5 schematically shows, by diode marks as symbols for electrical circuits, the state of interconnection of respective light emitting diodes in the illustrative configuration of the light emitting diodes.

In the arraying instance, shown in FIG. 4, the unit cells 4-1 and 4-2 are entirely identified with each other, and are interconnected by double-headed arrows shown at the center. FIG. 5 shows the manner of interconnection of the unit cells 4-1 and 4-2 by diode marks used in an electrical circuit diagram. In the present instance, the respective light emitting diodes, namely the red light emitting diodes 1, green light emitting diodes 2 and the blue light emitting diodes 3, are interconnected in series as shown, with the polarities of the respective diodes being such as to cause the current to flow from left to right in the drawing.

Figure 6:
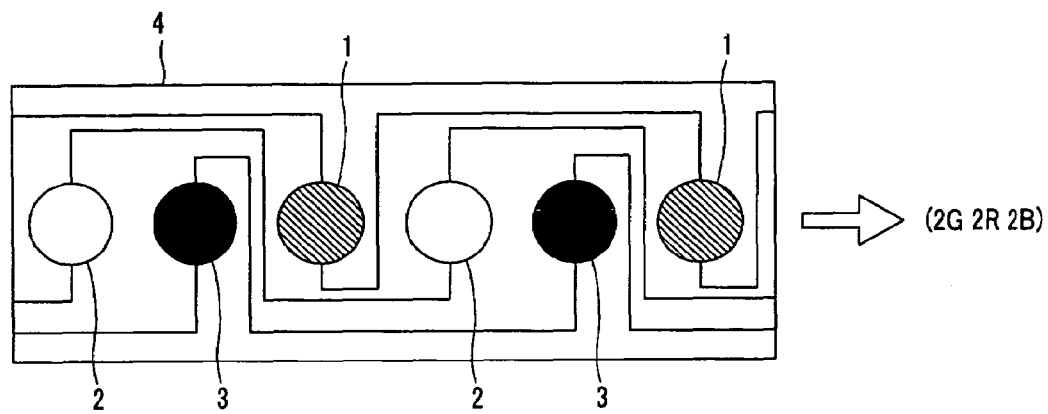
FIG. 6 shows a unit cell made up by each two red, green and blue light emitting diodes, totaling at six light emitting diodes, with the respective light emitting diodes being indicated by different color patterns and by the total number of the light emitting diodes used.
Figure 7:
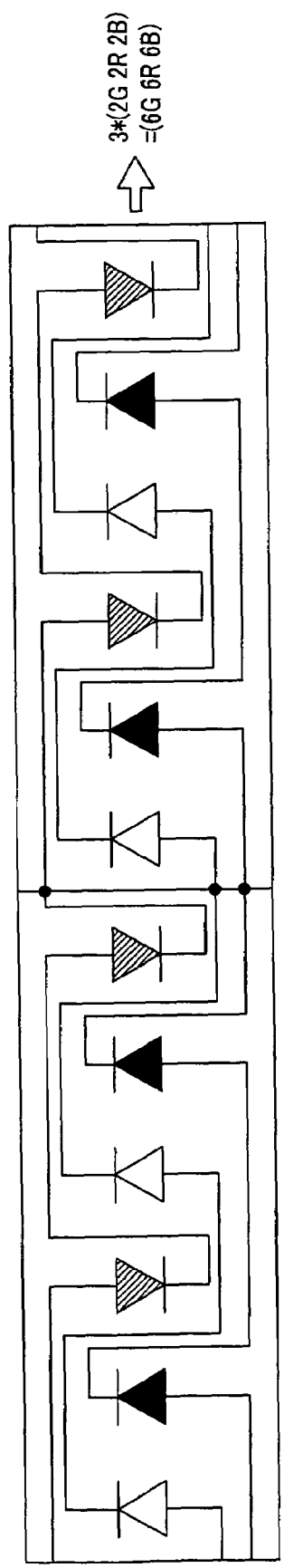
FIG. 7 shows a case where three of unit cells are interconnected in a line, with the respective light emitting diodes being indicated by different color patterns and by the total number of the light emitting diodes used.

If a unit cell 4, comprised of a linear array of two each of the red light emitting diodes 1, green light emitting diodes 2 and the blue light emitting diodes 3, with the total number of the light emitting diodes used being six, is represented with different color patterns of the respective light emitting diodes, the unit cell may be expressed as (2G, 2R, 2B), as shown in FIG. 6. This arraying symbol (2G, 2R, 2B) indicates that the basic unit is comprised of two each of the green, red and blue light emitting diodes, with the total number of the light emitting diodes used being six. In case three of these unit cells 4 are interconnected in series, the arraying symbol is 3*(2G, 2G, 2R), which may be expressed by (6G, 6R, 6B) if the numbers of the respective light emitting diodes are to be indicated in the symbol, as shown in FIG. 7.

An actual arraying instance of light emitting diodes in the light source 21 of the backlight light source unit 20 will now be explained, based on the representation shown in FIG. 7.

Figure 8:
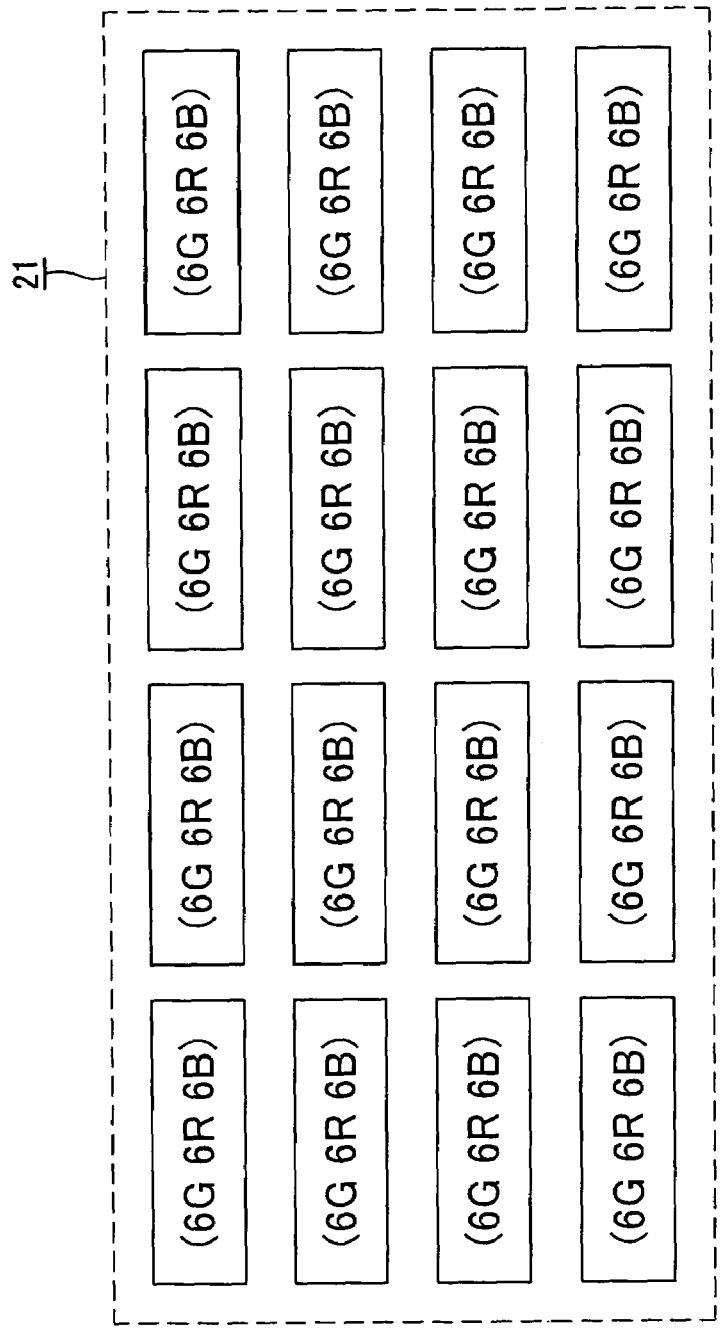
FIG. 8 shows an illustrative configuration of light emitting diodes in a light source of a backlight light source unit, with the respective light emitting diodes being indicated by patterns representing the numbers of light emitting diodes of respective colors used.

In the light source 21, there are arrayed four vertical columns and five horizontal rows, with a triplet of the basic units (2G 2R 2B) of the light emitting diodes as a medium size unit (6G, 6R, 6B), with the sum of the light emitting diodes being 360, as shown in FIG. 8.

Figure 9:
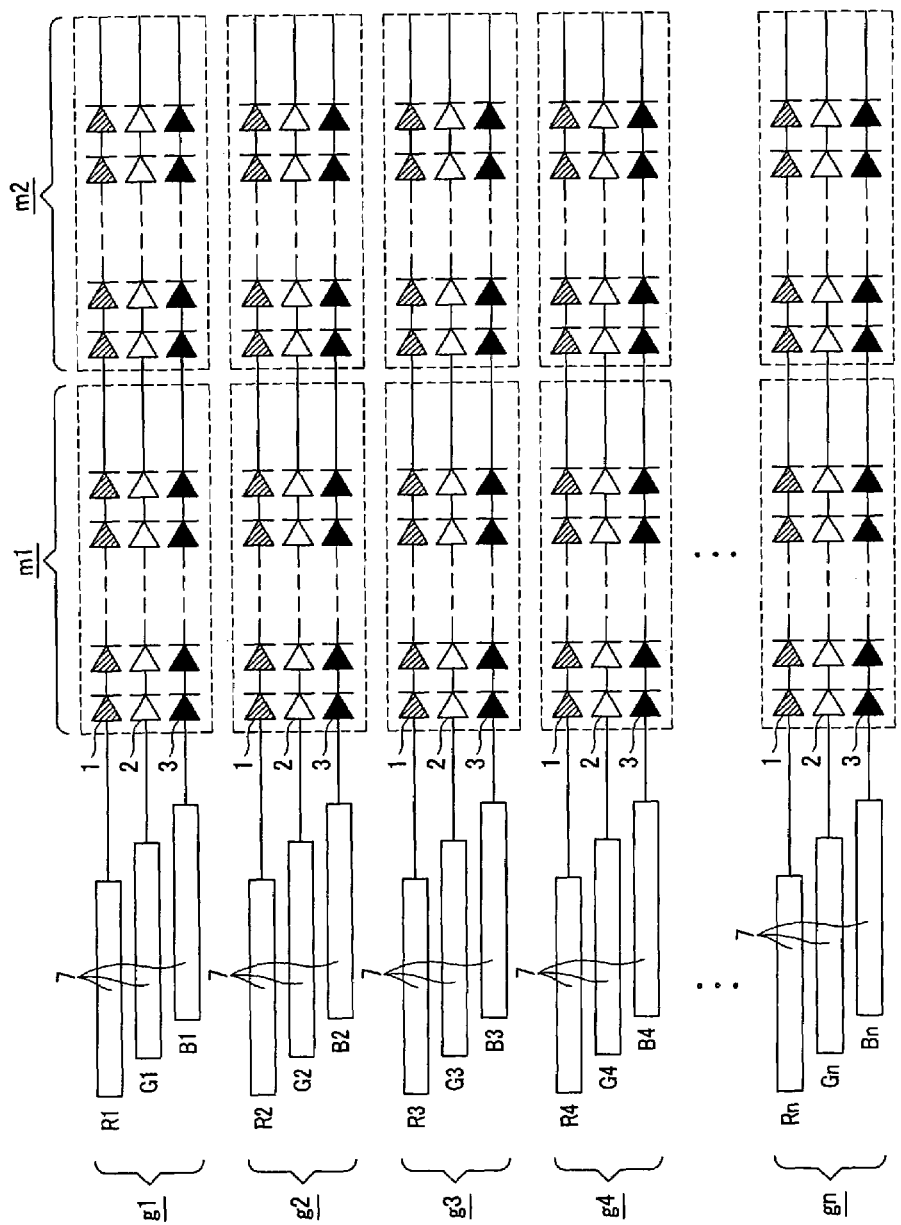
FIG. 9 shows a driving configuration of light emitting diodes in the backlight light source unit.

Since it is not that easy to address the totality of these 360 light emitting diodes, the backlight light source unit 20 is of a driving configuration such as is shown in FIG. 9.

That is, in each of RGB triplets g1 to gn, associated with n rows, respective light emitting diodes for R, G and B are independently connected in series, and are supplied with constant current by a DC-DC converter 7.

Figure 10:
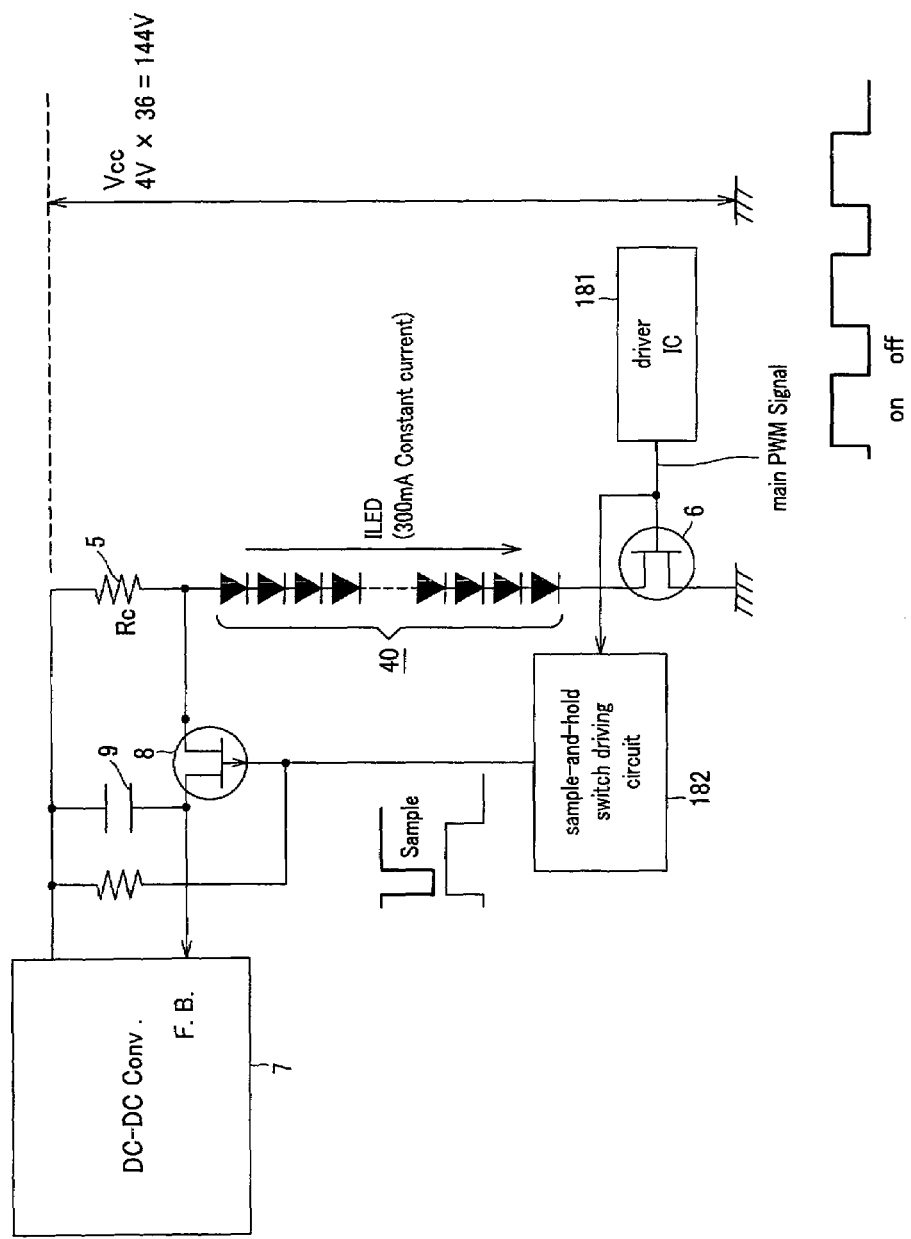
FIG. 10 is a block circuit diagram showing the configuration for causing the constant current to flow through plural series-connected light emitting diodes in the backlight light source unit.

Referring to FIG. 10, a specified illustrative structure for causing the constant current to flow through series-connected LED substrates m1, m2 will now be explained.

An LED string 40, comprised of a plural number of series-connected light emitting diodes LED1 to LEDn, has one end connected via a detection resistor (Rc) 5 to the DC-DC converter 7, while having the opposite end grounded via a FET 6.

The DC-DC converter 7 forms a feedback loop so that the converter detects the voltage drop, caused by the detection resistor 5, to cause the constant current ILED to flow through the LED string composed of series-connected LEDs, for a setting of the output voltage Vcc. In the present instance, the voltage drop, caused by the detection resistor 5, is fed back via a sample-and-hold circuit provided within the DC-DC converter 7.

The volume of light emitted by the respective light emitting diodes, forming the LED string, is increased or decreased by turning the current flowing through the LED string 40 on or off at a preset period by a main PWM (pulse width modulation) signal applied to the gate of the FET 6 from a driver IC 181 provided in the backlight driving controller 180.

That is, with the present backlight light source unit 20, the FET 6 is turned on or off by a main PWM signal, supplied from the driver IC 181 provided to the backlight driving controller 180, to turn on or off the driving current supplied from the DC-DC converter 7 to the LED string 40, composed of a series connection of plural light emitting diodes LED 1 to LEDn, in order to drive the light emitting diodes 41A to 41E with pulse width modulated constant current.

In the present instance, the sample-and-hold circuit is provided in the feedback loop for current detection for controlling the constant current with a wave crest value. This, however, is merely exemplary and any other suitable method may also be used.

Moreover, in the present instance, sample pulses, formulated by a sample-and-hold switch driving circuit 182 based on the main PWM signals, are supplied to a sample-and-hold switch 8.

It is noted that the LED string 40, shown in FIG. 10, corresponds to one of R, G and B strings, there being n triplets of the R, G and B strings, as shown in FIG. 9. Thus, a plural number of the circuits similar to the circuit of FIG. 10 equal to the number of the strings g1 to gn, multiplied by 3 in order to take R, G and B into account, is needed in the present instance.

Figure 11:
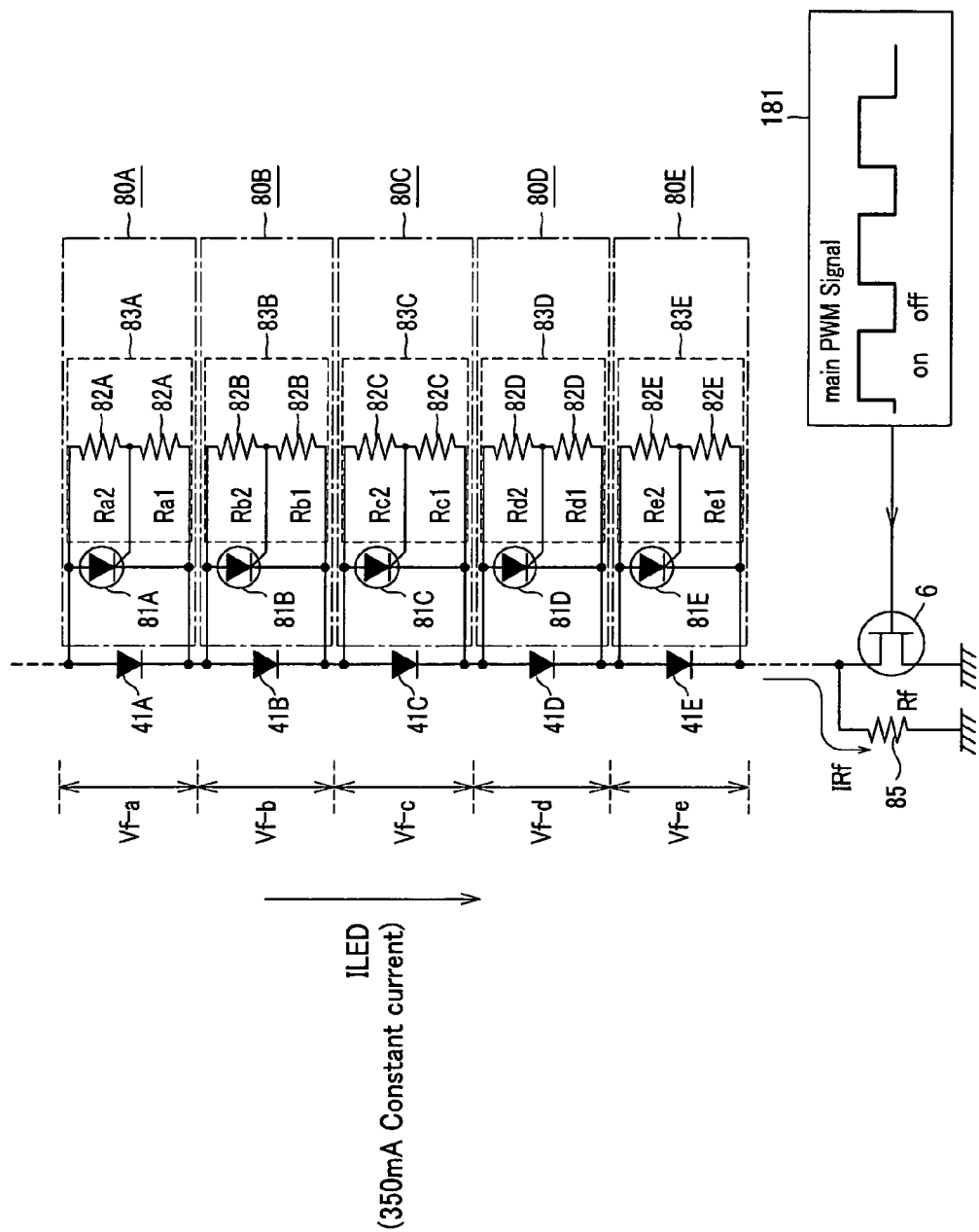
FIG. 11 is a block circuit diagram showing the configuration in which, in constant current driving of plural series-connected light emitting diodes, the current which might pass through a malfunctioning site caused by the OPEN mode failure of one of the light emitting diodes is made to detour the malfunctioning site to bypass automatically the site of disconnection.
Figure 12A:
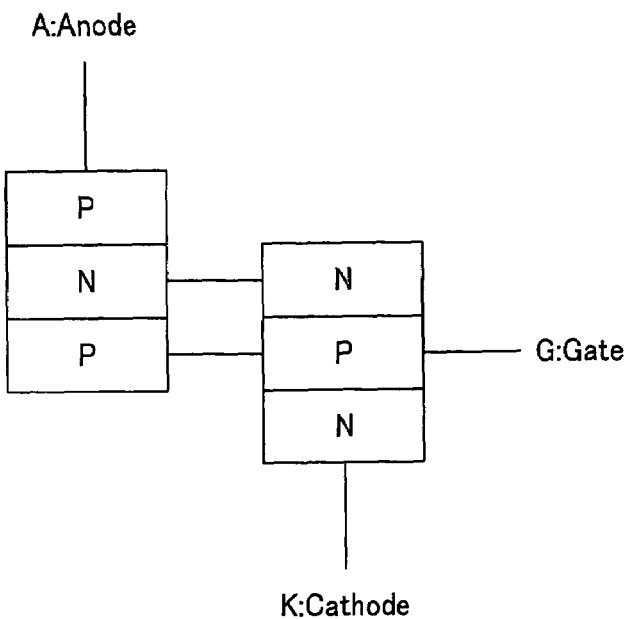
FIG. 12A shows the structure of a thyristor and FIG. 12B is a circuit diagram showing the operation thereof.
Figure 12B:
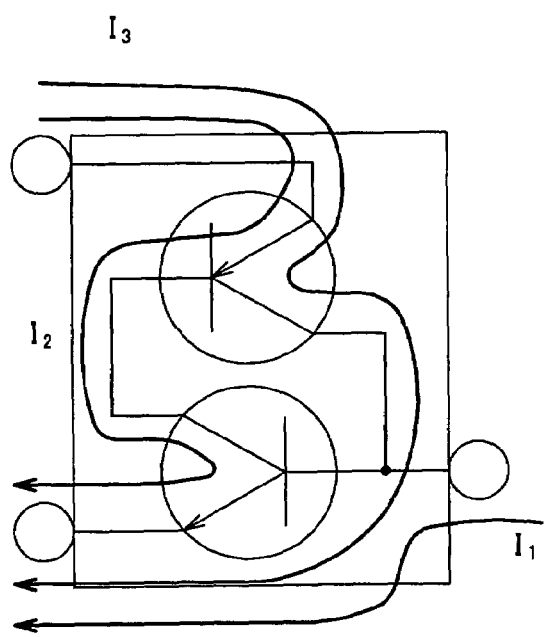
Figure 13:
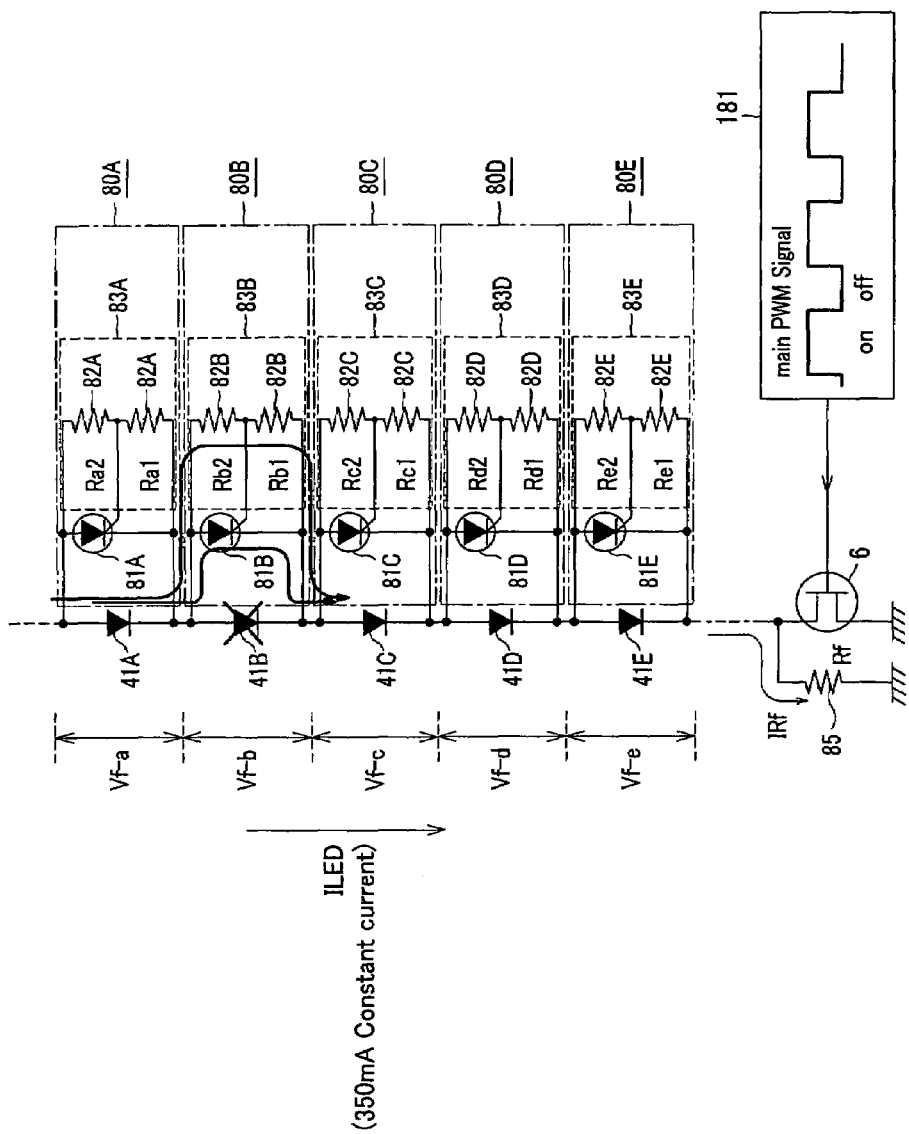
FIG. 13 is a block circuit diagram showing the configuration in which, in case of OPEN mode malfunction of plural series-connected light emitting diodes, the current which might pass through such malfunctioning site is made to detour the site to bypass automatically the site of disconnection.

Referring to FIGS. 11 to 13, the configuration used in constant-current driving of plural series-connected light emitting diodes of the present backlight light source unit for detouring the current which might pass through the failed site at the time of malfunctioning of the OPEN mode to bypass the disconnected state automatically, will now be explained.

That is, in the instance shown in FIG. 11, there are provided by-pass circuits 80A to 80E, composed of five thyristors 81A to 81E and five voltage dividing resistors 82A (Ra1 and Ra2) to 82E (Re1 and Re2), and which are connected in parallel with five series-connected light emitting diodes 41A to 41E.

The voltage dividing resistors 82A to 82E are connected at mid points thereof to the gate terminals of the thyristors 81A to 81E, and make up gate potential setting circuits 83A to 83E for supplying to the thyristors 81 A to 81 E a gate potential such that the thyristors 81 A to 81 E are turned off during the normal operation of the series-connected light emitting diodes 41A to 41E, and such that, when the light emitting diodes 41A to 41E are open-circuited, the thyristors 81A to 81E are turned on.

During the normal operation, the series-connected five light emitting diodes 41A to 41E display individual voltage drops of Vfa to Vfe, from above towards below, these voltage drops being variable depending on particular production lots. On the other hand, the series-connected five light emitting diodes 41A to 41E are PWM driven by the FET 6. In the present illustrative configuration, a resistor 85 (Rf) is connected in parallel with the FET 6 to permit the minimum hold current to flow through the resistor 85. This minimum hold current is selected so as to hold the turned-on thyristor in the so turned-on state.

The resistor 85 is provided for causing a minor quantity of current I□Rf to flow through the LEDs 41A to 41E in the turned-off state of the FET 6. That is, such a minor quantity of the holding current, for which complete light emission may not be expected but which will prohibit the thyristors from being turned on, is allowed to flow at all times.

The thyristor will now be briefly explained by referring to FIGS. 12A and 12B.

Referring to FIG. FIG. 12A, the thyristor is a four-layered device, namely a PNPN device, corresponding to a transistor added by a further PN junction. It is a device provided with three terminals, namely an anode A, a gate G and a cathode K. The electrical path across the anode and the cathode (A-K) is normally not conducting the current. However, on applying the plus (+) and the minus (−) voltages to the gate G and to the cathode K, respectively, the gate current ($I_1$) flows to cause the current to flow from the anode A to the cathode K, as shown in FIG. 12B. This state continues even after cessation of voltage application across the gate and the cathode (G-K). That is, in case the voltage is applied across the gate and the cathode (G-K) even for a short period of time, the current flows from the anode terminal A to the cathode terminal K through ($I_2$) and ($I_3$) to establish the conducting state. If the minimum holding current is caused to flow, without removing the voltage applied across the anode A and the cathode K (A-K), the current flow is sustained. The ON-resistance of the thyristor is low, such that the loss is minimum.

With the voltage drop in the light emitting diodes 41A to 41E in the normal operating state of the light emitting diodes, approximately 4V in the present instance, the gate potential setting circuits 83A to 83E maintain the thyristors 81A to 81E in the off-state.

In case OPEN mode malfunctions occur in e.g. the light emitting diode 41B, as shown in FIG. 13, the terminal voltage of this light emitting diode 41B is increased to cause the gate current to flow instantaneously to turn on the thyristor 81 B instantaneously. The ON-state of the thyristor 81 B, thus turned on, is sustained even after removal of the gate voltage, on account of the properties of the thyristor, except if the applied voltage is removed or the current falls to below the minimum holding current. Hence, by setting the resistance value of the resistor 85 to an appropriate value, it is possible to bypass effectively the light emitting diode suffering the OPEN malfunction.

The present invention is not limited to the above-described embodiment which has so far been explained with reference to the drawings and, as will be apparent to those skilled in the art, a wide range of modifications, substitution or equivalents may be attempted without departing from the scope and the purport of the invention as defined in the claims.

The invention claimed is:

1. A constant current driving unit for constant current driving a plurality of light emitting devices by a pulse width modulating constant current driving circuit, comprising:
   a bypass circuit including (a) a plurality of thyristors, each of which is connected in parallel with a respective one of said series connected light emitting diodes, and (b) a gate potential setting circuit;
   a switching device for pulse width modulation; and
   a resistor connected in parallel with said switching device for pulse width modulation,
   wherein,
   said gate potential setting circuit provides to said thyristors a gate potential value such that, when said light emitting devices are operating normally, said thyristors are in the off state,
   said gate potential setting circuit provides to said thyristors another gate potential value such that, when said light emitting devices are in the open state, said thyristors are on, and
   said resistor is coupled to said pulse width modulating constant current driving circuit via a transistor such that current for maintaining the on state of a turned-on thyristor flows through said resistor when said transistor is off.

2. A bypass circuit comprising:
   a plurality of thyristors;
   a plurality of voltage dividers each of which is coupled in parallel with a respective one of said thyristors;
   voltage dividers comprising operatively coupled resistors; and
   a plurality of series connected light emitting diodes,
   wherein,
   each voltage divider is connected to the gate terminal of its respective thyristor and supplies a gate potential value to the thyristor such that the thyristor is turned off during normal operation of said series-connected light emitting diodes and turned on when said series-connected light emitting diodes are open-circuited.

3. A gate potential setting circuit for a backlight light source comprising:
   a plurality of thyristors;
   a plurality of voltage dividers each of which is coupled in parallel with a respective one of said thyristors;
   voltage dividers comprising operatively coupled resistors; and a plurality of series connected light emitting diodes,
wherein,
each voltage divider is connected to the gate terminal of its respective thyristor and supplies a gate potential value to the thyristor such that the thyristor is turned off during normal operation of said series-connected light emitting diodes and turned on when said series-connected light emitting diodes are open-circuited.

4. A backlight light source unit for illuminating a display panel from a back side thereof, comprising:
   a plurality of light emitting diodes connected in series;
   a plurality of thyristors, each of which is connected in parallel with a respective one of said series connected light emitting diodes;
   a bypass circuit including said thyristors and a gate potential setting circuit;
   a switching device for pulse width modulation; and
   and a resistor connected in parallel with said switching device for pulse width modulation,
   wherein,
   said gate potential setting circuit provides to said thyristors a gate potential value such that, when the series connected light emitting diodes are operating normally, said thyristors are off
   said gate potential setting circuit provides to said thyristors another gate potential value such that, when said series connected light emitting diodes are in the open state, said thyristors are on and,
   said resistor is coupled to said pulse width modulating constant current driving circuit via a transistor such that current for maintaining the on state of a turned on thyristor flows through said resistor when the transistor is off.

5. A gate potential setting circuit for a backlight light source comprising:
   a plurality of thyristors;
   a plurality of voltage dividers each of which is coupled in parallel with a respective one of said thyristors;
   voltage dividers comprising operatively coupled resistors; and
   a plurality of series connected light emitting diodes,
   wherein,
   each voltage divider is connected to the gate terminal of its respective thyristor and supplies a gate potential value to the thyristor such that the thyristor is turned off during normal operation of said series-connected light emitting diodes and turned on when said series-connected light emitting diodes are open-circuited.

6. A color liquid crystal display apparatus comprising:
   a light transmitting color liquid crystal display panel including a color filter and a backlight light source unit, for illuminating said light transmitting color liquid crystal display panel from the back side thereof;
   a plurality of light emitting diodes connected in series;
   a bypass circuit including (a) a plurality of thyristors, each of which is connected in parallel with a respective one of said series connected light emitting diodes, and (b) a gate potential setting circuit;
   a switching device for pulse width modulation;
   and a resistor connected in parallel with said switching device for pulse width modulation,
   wherein,
   said gate potential setting circuit provides to said thyristors a gate potential value such that, when the series connected light emitting diodes are operating normally, said thyristors are off
   said gate potential setting circuit provides to said thyristors another gate potential value such that, when said series connected light emitting diodes are in the open-circuited, said thyristors are turned on, and
   said resistor is coupled to said pulse width modulating constant current driving circuit via a transistor such that current for maintaining the on state of a turned on thyristor flows through said resistor when the transistor is off.

* * * * *